United States Patent
Campbell

(10) Patent No.: US 6,574,646 B1
(45) Date of Patent: Jun. 3, 2003

(54) ELECTRONIC COMPUTING DEVICE FOR GRADING PURPOSES

(76) Inventor: Gordon Campbell, 128 Albany Rd., Oak Ridge, TN (US) 37830

( * ) Notice: Subject to any disclaimer, the term of this patent is extended or adjusted under 35 U.S.C. 154(b) by 458 days.

(21) Appl. No.: 09/634,982

(22) Filed: Aug. 9, 2000

(51) Int. Cl.[7] .............................................. G06F 15/02
(52) U.S. Cl. ................................................... 708/162
(58) Field of Search ......................... 708/162; 234/201, 234/202, 209

(56) References Cited

U.S. PATENT DOCUMENTS

| | | | | |
|---|---|---|---|---|
| 4,048,484 A | * | 9/1977 | Brittan | 708/162 |
| 4,118,783 A | * | 10/1978 | Collins | 708/445 |
| 4,282,580 A | * | 8/1981 | McGuire et al. | 708/445 |

* cited by examiner

Primary Examiner—David H. Malzahn
(74) Attorney, Agent, or Firm—Michael E. McKee

(57) ABSTRACT

An electronic computing device for providing a plurality of possible test grades on a scale of zero to one-hundred to a user includes a case and a computer mounted within the case. The computer includes a keyboard through which the total number of problems presented on a test is manually entered and a processor responsive to the total number of problems entered through the keyboard for generating a plurality of signals corresponding to possible test grades and for generating display signals corresponding to the possible test grades. A display associated with the case displays the possible test grades so that the user is visually informed of possible test grades based upon the total number of problems presented on the test.

5 Claims, 2 Drawing Sheets

ELECTRONIC COMPUTING DEVICE FOR GRADING PURPOSES

BACKGROUND OF THE INVENTION

This invention relates generally to the means and methods by which a test grade is computed and relates, more particularly, to accessories used by individuals for computing a test grade based upon the total number of problems given on a test and the number of problems of those total number of problems which have been answered incorrectly on the test.

Heretofore, there exists grade-computing accessories which can be used by teachers or other individuals to compute a test grade (on a grading scale of zero to one-hundred) based upon the total number of problems, or questions, given on a test and the total number of problems, or questions, answered incorrectly on the test. Such accessories, one of which is available from the E-Z GRADER COMPANY of Chagrin, Ohio under the trade designation E-Z GRADER, comprises a open-ended cardboard sleeve within which a cardboard scale is slidably received for linear movement therealong. A viewing window is formed in the sleeve, and it is through this window that numbers (corresponding with the number of problems comprising the test and the possible grades of that test) can be viewed by the user. By manually sliding the cardboard scale along the cardboard sleeve until the total number of problems comprising the test appears through the viewing window, a set of possible grades of the test, along with a corresponding set of a possible number of problems answered incorrectly on the test, are also viewable by the user.

However, such grade-computing accessories, such as the aforementioned E-Z GRADER-possesses limitations, one of which relates to the slowness of speed with which such accessories are used.

It is an object of the present invention to provide a new and improved device for calculating a test grade on a scale of zero to one-hundred, based upon the number of problems comprising a test and the number of test problems answered incorrectly.

Another object of the present invention is to provide such a device which readily informs the viewer of possible test grades based upon the number of problems presented on the test.

Yet another object of the present invention is to provide such a device-which is easy, quick to use, and effective in operation.

Still another object of the present invention is to provide such a device which also includes a calculator.

SUMMARY OF THE INVENTION

This invention resides in an electronic computing device for providing a plurality of possible test grades to a user.

The device includes a case and computer means mounted within the case. The computer means includes input entry means including a keyboard for manually entering the total number of problems presented on a test and processing means responsive to the total number of problems entered through the keyboard for generating a plurality of signals corresponding to possible test grades and for generating display signals corresponding to the possible test grades. Furthermore, display means are mounted in the case and are connected to the processing means for receiving the display signals generated by the processing means and for displaying the possible test grades so that the user is visually informed of possible test grades based upon the total number of problems presented on the test.

DETAILED DESCRIPTION OF THE ILLUSTRATED EMBODIMENT

Figure 1:
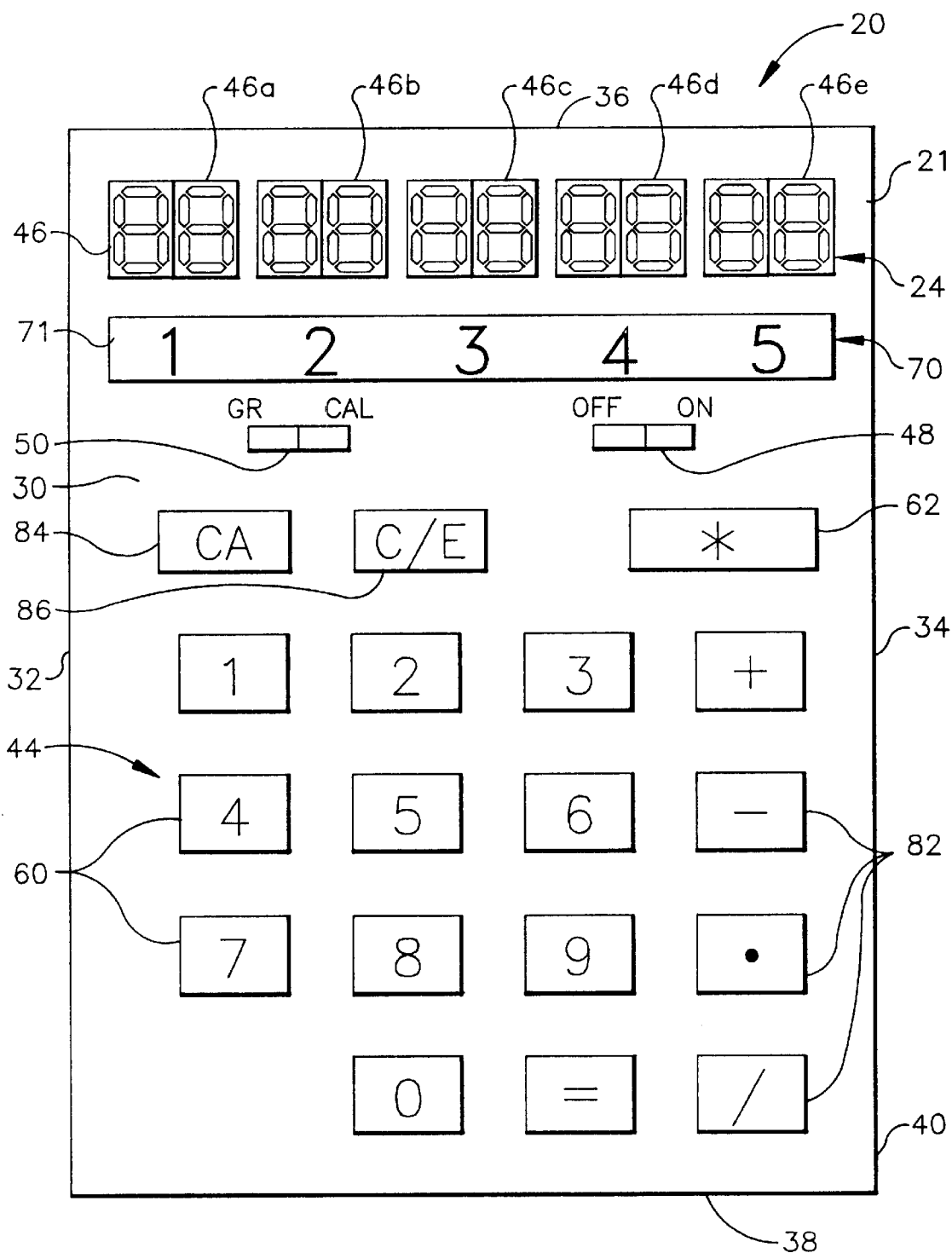
FIG. 1 illustrates in plan view one embodiment of an electronic computing device within which features of the present invention are incorporated.

Turning now to the drawings in greater detail, there is illustrated in FIG. 1 an embodiment 20 of a device which can be used to visually provide a user with a number of possible test grades, or scores, for a test, or quiz, having a number of problems, or questions. The device 20 is particularly well-suited for use by a teacher who is according grades on a grading scale of zero to one-hundred to tests having problems which are equally-weighed for grading purposes.

Figure 2:
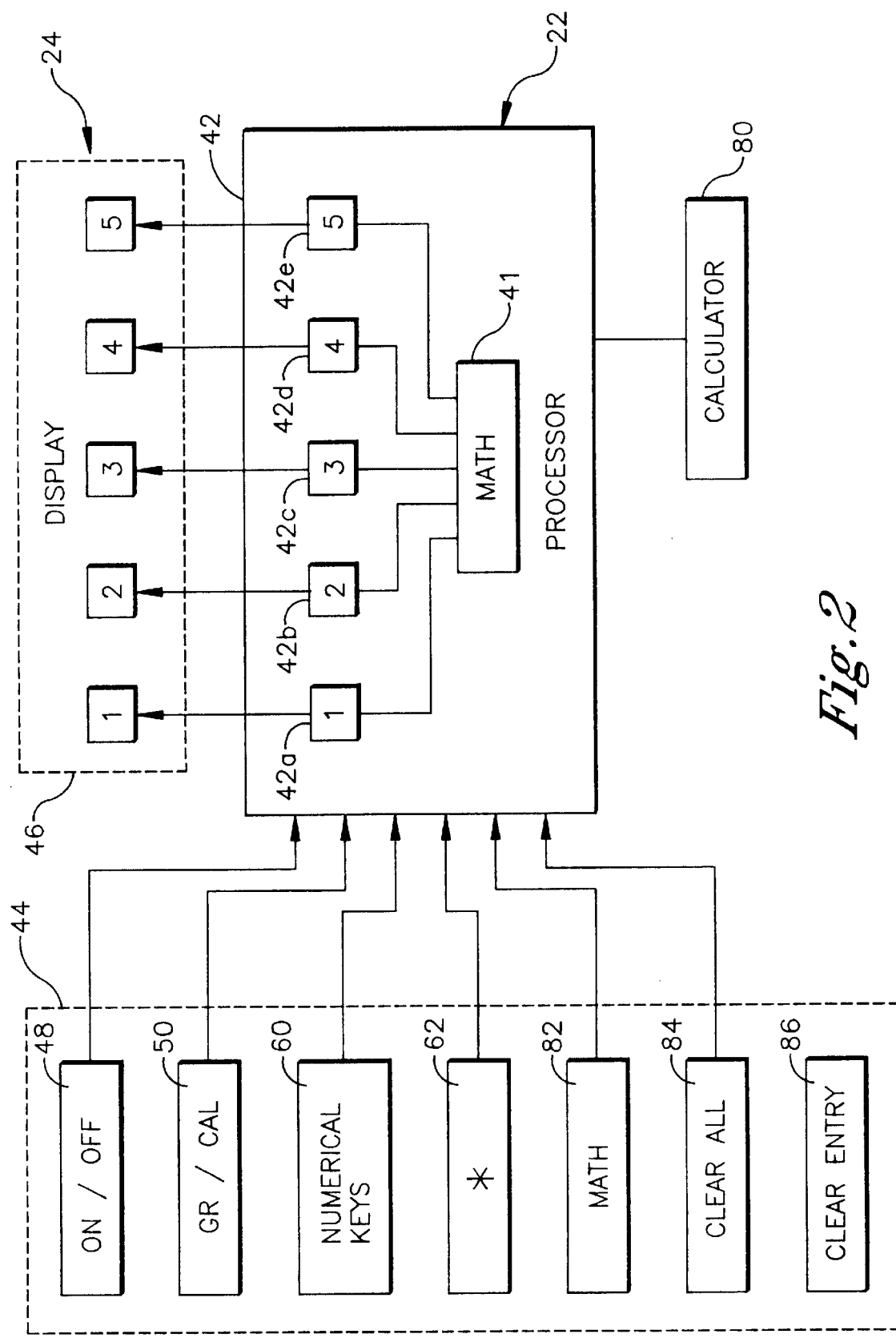
FIG. 2 is a block diagram illustrating the controls of the device of FIG. 1.

With reference to FIGS. 1 and 2, the device 20 includes a box-like case 21 and computer means, generally indicated 22, mounted within the case 21. As will be apparent herein, the computer means 22 includes means permitting the user to input the total number of problems which comprise a test and for performing a series of mathematical calculations with the entered total number of problems to determine a plurality of possible test grades based upon the input total number of problems. Display means 24 are associated with the computer means 22 and are mounted within the case 21 for visually displaying to the user the plurality of possible test grades.

The case 21 includes a top 30, two opposite sides 32, 34, two opposite ends 36, 38 and a bottom 40. The computer means 22 includes input entry means in the form of a manual keyboard 44 permitting a user to manually enter the total number of problems given on a test being graded. As illustrated, the keyboard 44 consists of a plurality of numeral keys 60, math function keys and operating keys for controlling the various modes of operation of the device 20, as described in greater detail in connection with FIG. 2. The display means 24 includes a digital display 46 provided in conjunction with the keyboard 44 and is comprised of multiple groups of LEDS or LCDS, which groups are designated 46a–46e in FIG. 1 and whose LEDs or LCDs are arranged in the conventional 7-segment configuration to generate number characters. Each display group 46a, 46b, 46c, 46d or 46e of the depicted device 20 includes two sets of 7-segment LED or LCD configuration and is thereby capable of displaying a two-digit (whole) number. The computer means 22 also includes a microprocessor 42 which is appropriately connected to the keyboard 44 for receiving input entries made through the keyboard 44 and for performing the various calculations, described in detail herein, with the input entries.

In addition to the computer means 22 and display 24, the case 21 also supports an ON/OFF switch 48 for controlling power in the device 20. Preferably, the device 20 is a self-contained unit as shown, and electrical power for operating the computer means 22 and the associated controls is derived from a battery pack positioned within the case 21. However, an external power supply can also be used.

The device 20 also includes a select switch 50 mounted in the case top 30 as shown in FIG. 1. The select switch 50 is a two-position switch which permits the user to switch the operation of the device 20 between a grading (GR) mode during which the total number of problems on a test are entered and various mathematical functions are performed with the entered number of problems and a calculator (CAL) mode enabling the device 20 to operate as a standard calculator.

It is a feature of the present invention that the microprocessor 42 is responsive to the total number of problems comprising the test being graded entered through the keyboard 44 so that a plurality of possible test grades on a grading scale of zero to one-hundred can be visually provided to the user. In this connection, the total number of problems comprising the test being graded are input into the microprocessor 42 through the keyboard 44, and after the total number of problems are input, an asterisk (*) key 62 is pressed to command the microprocessor 62 to perform a series of mathematical operations on the entered number of problems, and then displaying a plurality of possible test grades to the user by way of the display means 24.

More specifically, upon depression of the asterisk key 62, the microprocessor 42, by way of an operating circuit 41, divides the quantity one-hundred by the total number of problems comprising the test to be graded to provide a resulting (single) quotient value (or, more specifically, an electrical signal corresponding thereto), and then the resulting quotient value is multiplied by each of a number of possible problems answered incorrectly. To this end, the microprocessor 42 also includes preprogrammed operating circuits 42a–42e which are adapted to receive the quotient value (or, more specifically, the signal corresponding to the quotient value) from the operating circuit 41, and then multiply the quotient value by any of a number of preprogrammed values (e.g. 1, 2, 3, 4 or 5) wherein each of the values is a possible number of problems answered incorrectly on the test to provide a series of products (i.e. a series of signals corresponding to the products). The operating circuits 42a–42e then subtracts the products of the resulting series from the quantity one-hundred to provide one of a plurality of possible test grades on a grading scale of zero to one-hundred.

In the depicted embodiment 20, the operating circuits 42a–42e are preprogrammed to multiply the aforementioned resulting quotient value by each of the values 1, 2, 3, 4 and 5 for ultimately providing the user with the possible test grades based upon one, two, three, four and five problems, respectively, answered incorrectly. If, for example, the total number of problems comprising the test being graded is twenty, the operating circuit 41 divides the quantity 100 by twenty to obtain the quotient of five, then the operating circuits 42a–42e multiply the quotient of five by each of the values 1, 2, 3, 4 and 5, respectively, to obtain the resulting product values of 5, 10, 15, 20 and 25, respectively, and then the circuits 42a–42e subtract these product values from the quantity one-hundred to obtain the resulting FIGS. 95, 90, 85, 80 and 75, respectively (or, more specifically, to generate signals corresponding to the resulting FIGS. 95, 90, 85, 80 and 75, respectively). The signals corresponding to the resulting figures are then transmitted to the display 24 where they are displayed, in sequence from left to right across the case 21 as viewed in FIG. 1, by the display groups 46a–46e.

In addition, the device 20 includes indicia means, generally indicated 70 in FIG. 1, which present a number of possible problems answered incorrectly in juxtaposed relationship with the display 46 so that the number of problems answered incorrectly (up to a total of five) are positioned alongside the display group 46a, 46b, 46c, 46d or 46e which displays the corresponding grade computed by the device 20 for that number of incorrectly-answered problems. In this connection, the indicia means 70 of the depicted device 20 is provided by a strip 71 which is adhesively secured to the case 31 adjacent the display 46 and which bears the numerals "1", "2", "3", "4" and "5" on its exposed surface. By positioning the strip 71 adjacent the display 46 in the manner shown in FIG. 1, each of the numerals borne by the strip 71 is juxtaposed with the corresponding display group 46a, 46b, 46c, 46d or 46e which displays the grade for the number of incorrectly-answered problems.

More specifically, the, numeral "1" of the indicia means 70 is juxtaposed with the display group 46a (adapted to display the grade if one problem is answered incorrectly), the numeral "2" is juxtaposed with the display group 46b (adapted to display the grade if two problems are answered incorrectly), the numeral "3" is juxtaposed with the display group 46c (adapted to display the grade if three problems are answered incorrectly), the numeral "4" is juxtaposed with the display group 46d (adapted to display the grade if four problems are answered incorrectly), and the numeral "5" is juxtaposed with the display group 46e (adapted to display the grade if five problems are answered incorrectly). With the indicia means 70 positioned adjacent the display 46 in this manner, a user can readily identify which grade has been computed by the device 20 as being the grade which corresponds to a preselected number (i.e. any of one to five) problems missed on the test.

Within the depicted device 20, the operating circuits 42–42e are also pre-programmed to round off the calculated figures (corresponding to the possible test grades) to the nearest whole number. Therefore, the grades which are transmitted to and displayed by the display means 24 are whole numbers.

The device 20 also includes calculator circuitry 80 (FIG. 2), and this circuitry 80 responds to the numeral keys 60 and the math function keys 82 in a manner of a standard electronic calculator. It will be understood that the switch 50 must be positioned in the calculator (CAL) mode in order for the device 20 to be operated as a calculator. Accordingly, the device 20 combines capabilities to provide the user with a possible number of test grades (on a grading scale of zero to one-hundred) based upon the total number of problems contained within the test being graded with the capabilities of a standard calculator and is advantageous in this respect.

The keyboard 44 also includes a clear all key 84 and a clear entry key 86 appropriately connected to the microprocessor 42 for enabling the operator to clear the display 46 to a zero or null condition. As is the case with a standard calculator, depression of the clear all key 84 clears from the display 24 any information with which a computation is being performed, and depression of the clear entry key 86 clears from the display 24 only the most recent entry.

It will be understood that numerous modifications and substitutions can be had to the aforedescribed embodiment without departing from the spirit of the invention. For example, although the device 20 has been shown and described as a hand-held unit, a larger, desktop version can be constructed which embodies the principles and features of the device 20. Accordingly, the aforedescribed embodiment is intended for the purpose of illustration and not as limitation.

What is claimed is:

1. An electronic computing device for providing a plurality of possible test grades to a user, said device comprising:

a case;

computer means mounted within the case including:

- a) input entry means including a keyboard for manually entering the total number of problems presented on a test;
- b) processing means responsive to the total number of problems entered through the keyboard for generating a plurality of signals corresponding to possible test grades and for generating display signals corresponding to the possible test grades; and
- c) display means mounted in the case and connected to the processing means for receiving the display signals generated by the processing means and for displaying the possible test grades so that the user is visually informed of possible test grades based upon the total number of problems presented on the test.

2. The device as defined in claim 1 further including indicia means associated with the display means for designating to the user a plurality of possible number of problems answered incorrectly so that each possible test grade displayed by the display means is juxtaposed with a corresponding number of problems answered incorrectly.

3. The device as defined in claim 1 wherein the possible test grades are on a scale of zero to one-hundred, and the processing means includes means for performing a series of mathematical operations on the total number of problems entered in the keyboard to arrive at the possible grades for the test.

4. The device as defined in claim 1 wherein the computer means is adapted to display, by way of the display means, the possible test grades to a user wherein each possible test grade is rounded to the nearest whole number.

5. The device as defined in claim 1 wherein the keyboard includes numeral keys and math function keys and the device further includes calculator circuitry associated with the display means and responsive to the numeral keys and math function keys for performing mathematical calculations and for displaying the results of the mathematical calculations to the user through the display means.

* * * * *